UNITED STATES PATENT OFFICE.

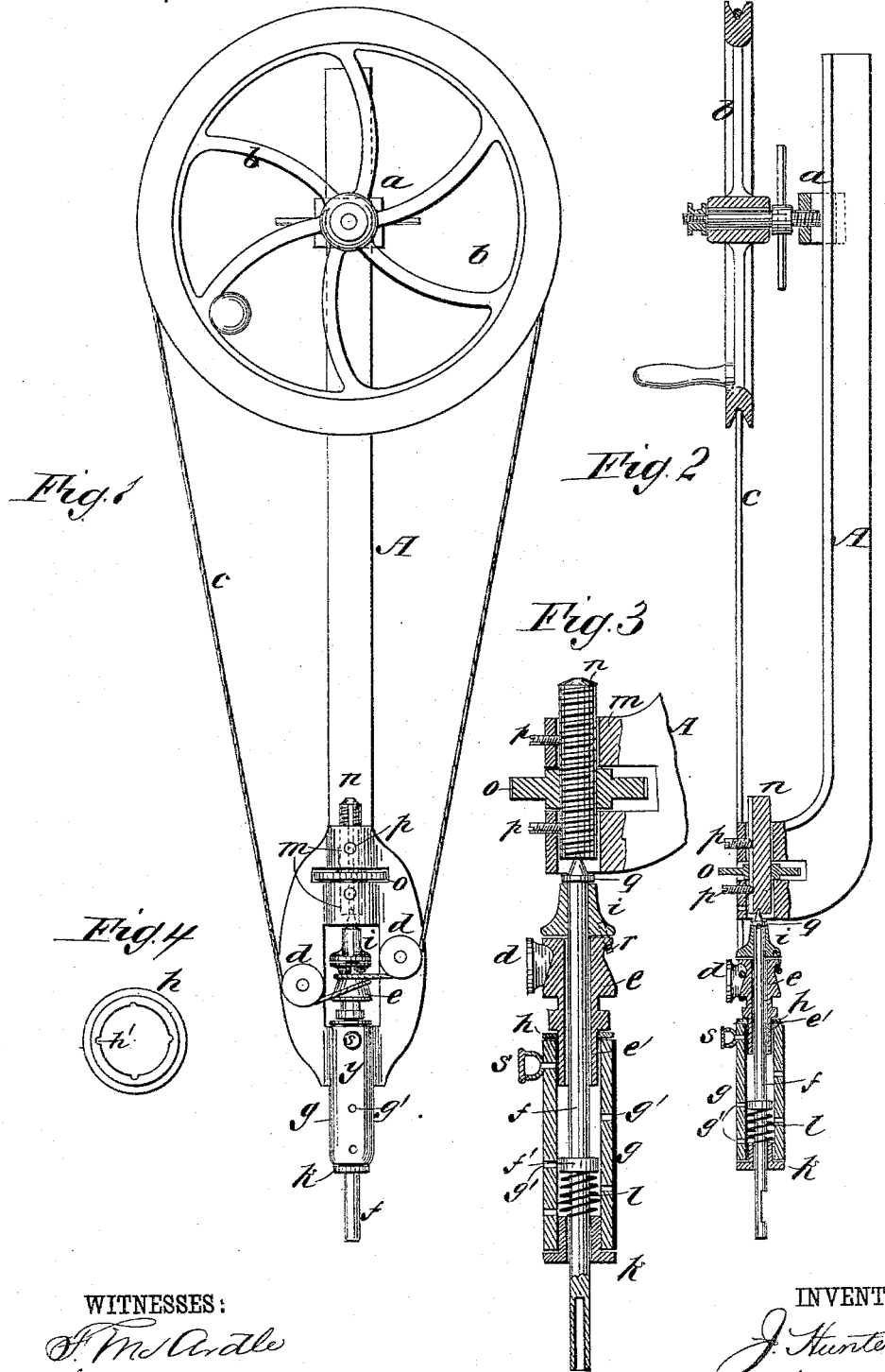

JOHN HUNTER, OF KINGSTON, ONTARIO, CANADA.

DRILLING APPARATUS.

SPECIFICATION forming part of Letters Patent No. 325,414, dated September 1, 1885.

Application filed June 18, 1884. (No model.)

*To all whom it may concern:*

Be it known that I, JOHN HUNTER, of Kingston, in the Province of Ontario and Dominion of Canada, have invented a new and useful Improvement in Drilling Apparatus, of which the following is a full, clear, and exact description.

My improvements relate to watch-makers' and jewelers' drills, the object being to furnish one adapted for both light and heavy work; and the invention consists in certain novel features of construction, as hereinafter described and claimed.

Reference is to be had to the accompanying drawings, forming a part of this specification, in which similar letters of reference indicate corresponding parts in all the figures.

Figure 1 is a front elevation of a drill of the improved construction. Fig. 2 is a sectional side elevation of the drill; and Fig. 3 is a section and partial elevation in larger size, of the spindle and connected parts. Fig. 4 is a detail view.

A is a hanger or post of suitable form for carrying the mechanism. $a$ is an adjustable clamp on the hanger, having a stud that carries the operating-wheel $b$. $c$ is a cord from wheel $b$, passing beneath guide-rollers $d\ d$ on the lower part of the hanger to the conical spool $e$ on spindle $f$. This spool $e$ is loose on the spindle, and is made with a tubular extension or sleeve, $e'$, that extends into the box or tube $g$ on the hanger, and rests by a flange or an interposed collar, $h$, so that the spool is sustained without contact with the spindle. Above the spool a friction collar or disk, $i$, is attached to the spindle. Secured within the lower end of box $g$ is a sleeve, $k$, bored to fit the spindle closely, so as to center it, and on the spindle above sleeve $k$ is a spiral spring, $l$, taking beneath a collar, $f'$, whereby the spindle is kept central and forced upward to keep the disk $i$ normally out of contact with the spool $e$.

In an upper box, $m$, on the hanger is a screw, $n$, formed at its lower end as a step for the pointed end of the spindle $f$, and on the screw is a nut, $o$, for raising and lowering the screw, which is kept from turning by set-screws $p$. When the screw $n$ is moved down, the disk $i$ is forced upon the spool, thereby causing rotation of the spindle from the spool. For heavy work, when a positive connection between the spool and disk $i$ is desirable, the spool carries a small screw, $r$, that can be turned in to engage a hole in the disk.

The box $g$ has holes $g'$, for oiling, and collar $h$ has notches $h'$, (shown in Fig. 4,) to allow oiling. The bearing of the spool is oiled from a cup, $s$, attached to the box $g$.

This drilling-machine is adapted for all the ordinary work of watch-makers and jewelers, and the tension or friction can be made light enough to run small drills, such as are usually operated by bows.

The machine may be attached to any of the usual fixtures; or it may be held in a vise when in use.

Having thus described my invention, I claim as new and desire to secure by Letters Patent—

1. In a drill, the combination of loose spool $e$, friction-disk $i$, box $g$, and spindle $f$, fitted for endwise adjustment, substantially as described.

2. In a drill, the combination of spindle $f$, box $g$, and loose spool $e$, formed with a tubular extension, $e'$, substantially as and for the purpose specified.

3. The combination of box $g$, sleeve $k$, spring $l$, collar $f'$, and spindle $f$, stepped in a bearing at the upper end, substantially as described.

4. The combination of the screw $n$ and nut $o$ with spindle $f$, disk $i$, and loose spool $e$, substantially as described.

5. In a drill, the combination of a spindle fitted for endwise movement, a friction-disk and a loose sleeve on the spindle, a screw for moving the spindle and causing contact of the disk and spool, and a spring acting to release the parts, substantially as shown and described.

JOHN HUNTER.

Witnesses:
  THOS. MCADAMS,
  JNO. A. MCMAHON.